Feb. 16, 1965 — A. M. STOTT — 3,169,443
PROPELLANT ACTUATED RELEASE BOLT
Filed July 20, 1962
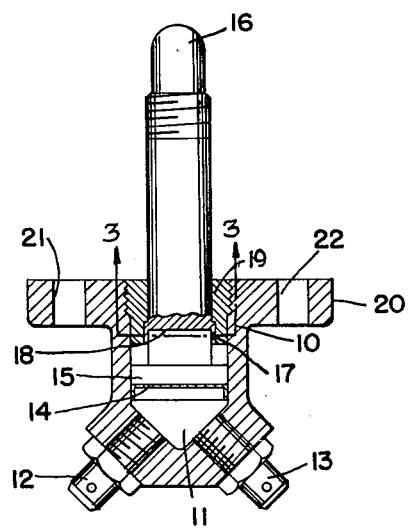
FIG.I.
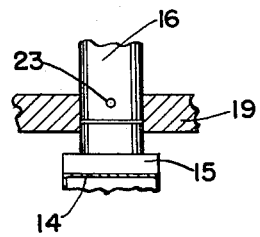
FIG. 2.
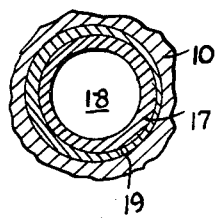
FIG. 3
*INVENTOR.*
ALBERT M. STOTT
BY
ATTORNEYS:

3,169,443
PROPELLANT ACTUATED RELEASE BOLT
Albert M. Stott, Clifton Heights, Pa., assignor to the United States of America as represented by the Secretary of the Army
Filed July 20, 1962, Ser. No. 211,462
1 Claim. (Cl. 89—1)
(Granted under Title 35, U.S. Code (1952), sec. 266)

The invention described herein may be manufactured and used by or for the Government for governmental purposes without the payment to me of any royalty thereon.

This invention relates to bolts such as are operated by the firing of a propellant to release the parts held together by them. It provides an improved propellant actuated release bolt which functions without the objectionable emission of gas and without the scattering of metal fragments and with the shearing action for release of the bolt occurring longitudinally of the bolt axis instead transversely thereof.

Many types of propellant actuated release bolts have been provided heretofore. These prior art release bolts, however, generally have the disadvantage that their operation results in the emission of hot gas and the scattering of metal fragments. Under some circumstances, it is desirable that one or both of these results be avoided. This is accomplished by the present invention.

The invention will be better understood from the following description when considered in connection with the accompanying drawings and its scope is indicated by the appended claim.

Referring to the drawings:

FIG. 1 is a partial sectional view of one modification of the invention,

FIG. 2 is a fragmentary view of a different modification, and

FIG. 3 is an enlarged sectional view taken substantially along lines 3—3 of FIG. 1.

The release bolt of FIG. 1 includes a body 10 which is hollowed out to form a recess. At the inner end of this recess is a firing chamber 11 which has at its outer end ignition elements 12 and 13 and at its inner end an obturator 14. A piston 15 is movable in the body 10 and has one of its ends resting against the obturator cup 14.

A bolt 16 is threaded at its outer end and has an eccentric head 17 which engages an insert 19 having a mating eccentric counterbore. The head of the bolt 16 is recessed at 18 to receive the end of the shear piston 15. Axial play between the insert 19, the bolt 16, the piston 15 and the obturator 14 is eliminated by tightening the threaded insert 19 into the body 10. The body 10 has a flange 20 with two holes 21 and 22 through which the unit may be attached to one of the parts held together by it.

The propellant in the firing chamber 11 may be ignited by any one of the ignition elements each of which includes a high resistance wire heated by the application of a voltage to the outer terminals of the igniter. Although the ignition elements could be assembled in a T fitting, greater initial thrust is realized by directing the elements more nearly toward the line of action as illustrated.

Upon the firing of the propellant, the generated gas pressure forces the obturator cup against the piston, the piston transfers the pressure to the bolt, and the head is sheared from the bolt. This permits separation of the two parts, the first of which may or may not be bolted to the flange 20 and the second of which is held against the first by a nut (not shown) threaded onto the bolt 16. An advantage in the head being eccentric to the bolt axis is that when a unit or the like is threaded onto the upper or outer end of this bolt 16 any tendency for the bolt to turn will be opposed by the eccentricity of the head 17. An advantage in the shearing action being longitudinal of the bolt axis is that the shear area may be readily controlled by design and by having the head 17 of varied longitudinal extent without affecting bolt cross-sectional area.

The modification of FIG. 2 differs from that of FIG. 1 in that the head 17 is replaced by a shear pin 23. The operation of the two modifications is the same.

I claim:

In a propellant actuated release bolt having longitudinally extending bolt means, a hollow body supporting said bolt means and having a recessed inner end portion constituting a firing chamber for containing propellant, an ignition element for said propellant, a piston movable longitudinally of said bolt and within said chamber, an obturator between said piston and ignition element, said bolt means having an enlarged eccentric inner end or head portion integral therewith, an insert secured to said body and having one portion surrounding said bolt means and in longitudinal abutment with said head and another eccentrically recessed portion mating with said eccentric bolt head, said enlarged inner end or head of said bolt means having a cylindrical recess or counterbore of substantially the same diameter as the outside shank diameter of said bolt means and of less length than said enlarged inner end or head of said bolt means, and said piston having a cylindrical projection substantially filling said counterbore to longitudinally shear an annulus portion of said enlarged end or head from said bolt means.

References Cited by the Examiner
UNITED STATES PATENTS

| | | | |
|---|---|---|---|
| 484,007 | 10/92 | Haskell | 89—8 |
| 1,432,243 | 10/22 | Harris | 151—68 |
| 2,421,807 | 6/47 | Rickey et al. | 89—1.5 |
| 2,489,984 | 11/49 | Shoemaker | 89—1.5 |
| 2,516,902 | 8/50 | Musser | 89—1 |
| 2,883,910 | 4/59 | Nessler | 89—1.5 |
| 2,949,822 | 8/60 | Musser | 89—1.5 |
| 3,053,131 | 9/62 | Stott | 89—1 |
| 3,084,597 | 4/63 | Beyer | 89—1 |

BENJAMIN A. BORCHELT, *Primary Examiner.*

SAMUEL BOYD, SAMUEL W. ENGLE, *Examiners.*